June 2, 1936.    O. B. JACOBS    2,042,530
SUBMARINE SIGNALING CABLE
Filed Sept. 25, 1931
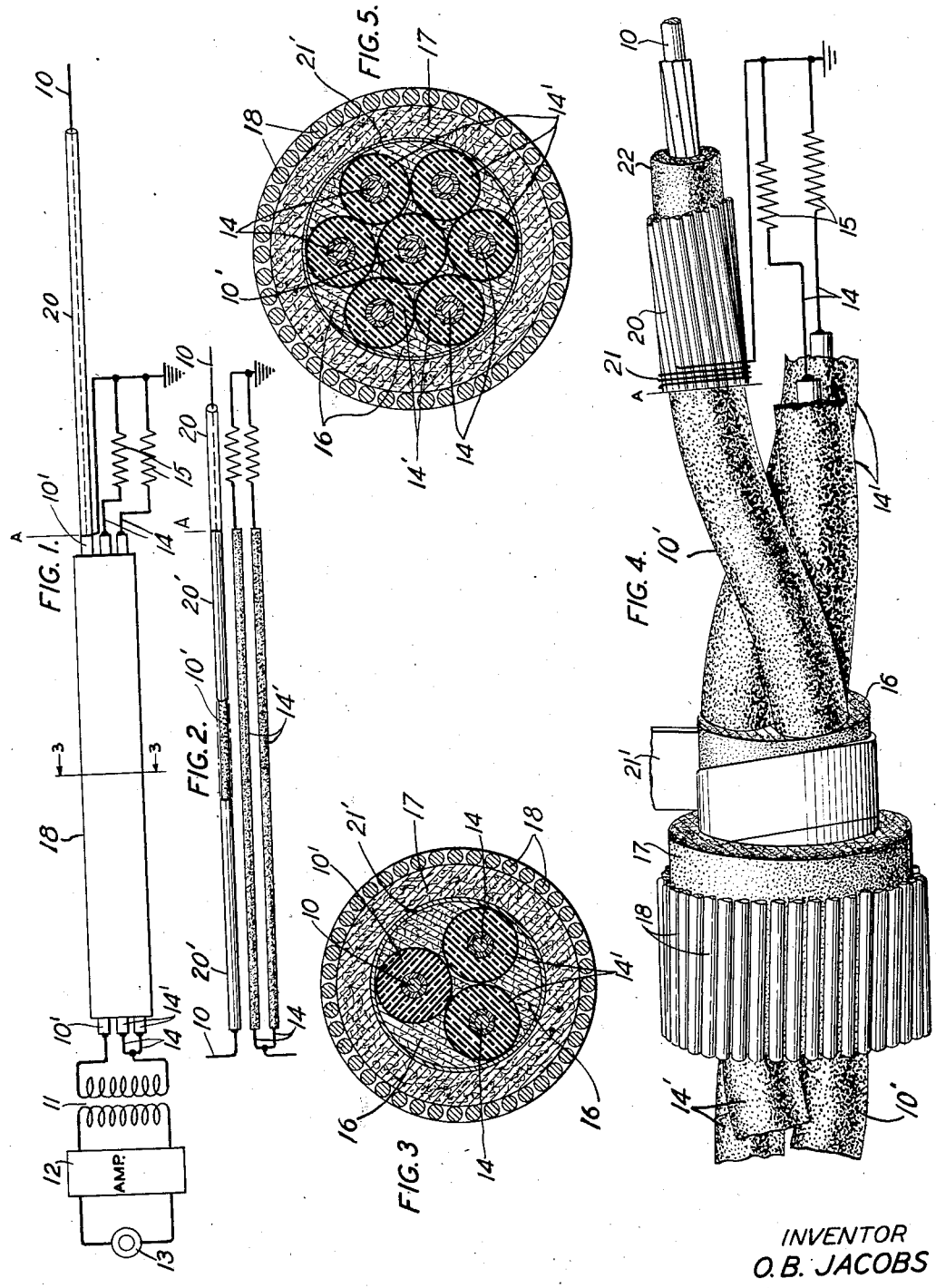
INVENTOR
O. B. JACOBS
BY
J. W. Schmied
ATTORNEY Patented June 2, 1936

2,042,530

UNITED STATES PATENT OFFICE 2,042,530

SUBMARINE SIGNALING CABLE

Oliver B. Jacobs, Morristown, N. J., assignor to Bell Telephone Laboratories, Incorporated, New York, N. Y., a corporation of New York Application September 25, 1931, Serial No. 565,045

5 Claims. (Cl. 178—45)

The present invention relates to submarine signaling cables and more particularly to single core and concentric return submarine telephone and telegraph cables.

In order to minimize the effects of atmospheric and telluric electrical disturbances (hereinafter referred to as static) in submarine signaling cables, it is customary to provide these cables with a balancing sea-earth cable extending at least several miles seaward. The use of such a sea-earth cable entails the disadvantage of increasing the effects of another type of electrical disturbance which is caused by the thermal agitation of electrons in the cable conductors. This disturbing noise is currently referred to as "resistance noise". Expressed numerically, the use of a single sea-earth cable results in twice as much resistance noise in the receiving circuit as would be the case if a direct ground connection were substituted for the sea-earth at the receiving end of the cable. Expressed in transmission units, the resistance noise is about 3 db (decibels) higher when a sea-earth is used instead of a direct ground connection.

The present invention has for its primary object to reduce the resistance noise level of a submarine signaling cable having a sea-earth connection.

In accordance with this invention, the object stated is attained by providing two or more sea-earth cables in parallel with each other. Thus the impedance of the sea-earth connection is diminished while the voltage of external interference remains the same as before. The reduction in the impedance of the sea-earth connection results in a reduction of the resistance noise voltage applied to the receiving amplifier; this reduction may reach a value up to the theoretical maximum reduction of 3 decibels in case of an infinite number of sea-earth connections. For one additional sea-earth the reduction would be 1.24 db, for two additional sea-earths 1.75 db, and for three additional sea-earth connections it would be 2.03 db.

In practical embodiments of the present invention the sea-earth cables may either be enclosed in the same armor as the main cable, or may be located, as separate cables, as close to the main cable as practicable.

In the accompanying drawing identical reference characters designate similar parts.

Fig. 1 shows a schematic circuit diagram of the terminal apparatus and terminal sections of a submarine cable telephone system comprising two sea-earth connections in parallel, the sea-earth cables being enclosed in the same armor as the main cable;

Fig. 2 diagrammatically illustrates an embodiment of the invention which is essentially identical with Fig. 1 except that the sea-earth cables are located outside of the armor of the main cable;

Fig. 3 shows a cross-section along line 3—3 of Fig. 1;

Fig. 4 presents a diagrammatical telescoped side elevation of the composite cable shown in Fig. 1; and Fig. 5 shows a cross-section through a submarine cable containing a main conductor and six sea-earth connections contained in one armor.

In Fig. 1 a main insulated submarine signaling cable 10 which may preferably have a grounded concentric return conductor such as shown at 20 (such as described, by way of example, in application for patent Serial No. 392,351, filed September 13, 1929 by O. E. Buckley and issued as Patent 1,903,975 on April 18, 1933) is connected as shown at A to an insulated and armored main cable 10′. The cable 10′ has no special return conductor; its armor is shown at 18. The cable 10′ is connected as shown to a transformer 11, an amplifier 12 and a telephone 13. Two insulated sea-earth cables 14′ are provided within the armor 18 and their metallic central conductors 14 are connected to the line winding of transformer 11 in parallel. The metallic conductors 14 of the sea-earth cables 14′ extend seaward to a point where the depth reached permits the sea water to have a shielding effect sufficient to render negligible the electrical interference in the portions 10 and 20 of the main cable extending beyond that point. In practice, this distance may vary from about two miles to thirty miles or more, depending upon the signaling frequencies employed and the slope of the sea bottom near the coast. Each sea-earth conductor 14 is connected to the concentric return conductor 20 which is in continuous contact with the sea water and thus grounded as shown and an impedance element 15 is inserted in each conductor at its grounded end. Each of the impedance elements 15 preferably has a value closely approximating that of an infinite length of a single core cable of the type used for the main core beyond the end of the sea-earth conductors. Its purpose is to terminate each sea-earth in the same impedance as effectively terminates the main conductor in the section in which the sea-earth conductors are associated with it, so that all of the conductors will have substantially the same electrical characteristics.

As shown by Fig. 3 the composite cable formed by the insulated main cable conductor 10' and the insulated sea-earth cables 14' is surrounded by jute fillers 16 to form a structure having a cylindrical composite core. A fabric tape 21' is applied around this core. The tape 21' is, in turn, surrounded by a further layer of jute 17. This forms a bedding for the armor wires 18.

In the modification of the invention shown in Fig. 2, the main cable 10' and the sea-earth cables 14' are not contained within the same armoring sheath, but each individual cable is insulated and armored in a manner well known in the art. In this case the concentric return conductor 20 of the deep-sea portion of the main cable 10 may preferably be continued to the left of the point A as shown at 20 and 20'. Apart from these features the modification shown in Fig. 2 is identical with that shown in Fig. 1.

Fig. 4 shows the details of the embodiment disclosed in Fig. 1, particularly the constructional details relating to the main cable 10, and the manner in which the shallow water section 10' of the main cable conductor 10 is associated with the sea-earth cables 14 to form a three-conductor cable at points to the left of point A. In this modification of the invention the concentric return conductor 20 is constituted by a number of copper wires or tapes as shown. Preferably the left-hand ends of the return conductor wires may be bound to the insulated core by wires 21. The insulation 22 of the main cable extends to the left of point A into the triple conductor, but the concentric return conductor 20 is terminated at the point A. The armor 18, the jute 17, the fabric tape 21' and the filler 16 are not extended to the point A in the drawing in order to show the manner in which the main cable core 10' and the sea-earth cable cores 14 are laid up.

Fig. 5 shows a modification of the invention in which the main cable core 10' is surrounded by six sea-earth cores 14' under one and the same armor 18. Apart from this feature, the embodiment disclosed in Fig. 5 is substantially identical with that shown in Fig. 1.

It may occur to those skilled in the art that the sea-earth cables may be partly provided within the same armor as the main cable and partly outside the armor of the main cable and such a modification of the invention is to be considered within the scope of the following claims.

What is claimed is:

1. A submarine cable signaling system comprising a plurality of individually insulated sea-earth cables, characterized in this that a direct connection of negligible impedance is connected between the shore terminals of at least two of the sea-earth cables.

2. A submarine cable telephone system comprising an individually insulated sea-earth connection and means for reducing the effect of noise caused by the thermal agitation of electricity in said system, said means including at least one additional individually insulated sea-earth connection in parallel to said first mentioned sea-earth connection.

3. A submarine cable signaling system comprising a main cable having a concentric return conductor and a plurality of sea-earth cables each of which is individually insulated and upon which the return current is impressed at the shore end, said sea-earth cables being grounded some distance at sea.

4. A submarine cable system comprising a main insulated submarine cable conductor, a plurality of individually insulated sea earth cable conductors, and means to reduce the effect of noise caused by thermal agitation of electricity in said conductors which comprises a direct connection of negligible impedance between the shore terminals of said plurality of sea earth cable conductors.

5. A submarine cable system comprising a main insulated cable conductor, a plurality of individually insulated sea earth cable conductors, and conductive connecting means having substantially zero impedance for connecting all of the shore terminals of said insulated sea earth cable conductors together.

OLIVER B. JACOBS.